(12) United States Patent
Reust

(10) Patent No.: US 8,739,680 B2
(45) Date of Patent: Jun. 3, 2014

(54) HYDRAULIC PRESSURE FEEDBACK FOR SERVOVALVES

(76) Inventor: Dennis Reust, Stillwater, OK (US)

(*) Notice: Subject to any disclaimer, the term of this patent is extended or adjusted under 35 U.S.C. 154(b) by 845 days.

(21) Appl. No.: 12/906,786

(22) Filed: Oct. 18, 2010

(65) Prior Publication Data
US 2011/0168012 A1 Jul. 14, 2011

Related U.S. Application Data

(60) Provisional application No. 61/252,516, filed on Oct. 16, 2009.

(51) Int. Cl.
*F15B 13/044* (2006.01)
(52) U.S. Cl.
USPC .................................. 91/433; 137/625.68
(58) Field of Classification Search
USPC ........................ 91/433; 137/625.68, 625.69
See application file for complete search history.

(56) References Cited

U.S. PATENT DOCUMENTS

| | | | | |
|---|---|---|---|---|
| 3,949,645 | A * | 4/1976 | Masclet ........................... | 91/459 |
| 4,827,981 | A * | 5/1989 | Livecchi et al. ......... | 137/625.69 |
| 5,128,908 | A | 7/1992 | Reust | |
| 5,248,126 | A * | 9/1993 | Pruss et al. .................... | 251/368 |
| 5,325,891 | A * | 7/1994 | Mateja ..................... | 137/625.48 |
| 6,024,200 | A * | 2/2000 | Jang ............................ | 192/85.01 |
| 6,142,181 | A * | 11/2000 | Schumacher ............ | 137/625.21 |
| 6,269,733 | B1 * | 8/2001 | Reust ............................. | 91/415 |
| 7,000,892 | B2 * | 2/2006 | Kim et al. ................ | 251/129.04 |

FOREIGN PATENT DOCUMENTS

| | | |
|---|---|---|
| JP | 2001-012409 | 1/2001 |
| KR | 10-2002-0034473 | 5/2002 |
| KR | 10-0430052 | 5/2004 |
| KR | 10-0870726 | 11/2008 |

OTHER PUBLICATIONS

International Search Report for PCT/US2010/053045, Jun. 28, 2011.

* cited by examiner

*Primary Examiner* — Thomas E Lazo
(74) *Attorney, Agent, or Firm* — Dunlap Codding, PC

(57) ABSTRACT

A spool for a servovalve. The spool includes a first end land and a second end land. The spool includes an intermediate land having a first side and a second side opposite the first side. The intermediate land is positioned between the first end land and the second end land in a spaced-apart, axially aligned relationship such that a first annular space is defined between the first end land and the first side of the intermediate land and a second annular space is defined between the second end land and the second side of the intermediate land. The intermediate land further includes at least one fluid passageway formed in and extending through the intermediate land from the first side to the second side to establish fluid communication between the first annular space and the second annular space to provide a fluid pressure feedback between the first and second annular spaces.

13 Claims, 8 Drawing Sheets

HYDRAULIC PRESSURE FEEDBACK FOR SERVOVALVES

CROSS-REFERENCE TO RELATED APPLICATIONS

This application claims the benefit of U.S. Provisional Application No. 61/252,516, filed Oct. 16, 2009, which is incorporated herein by reference in its entirety.

BACKGROUND OF THE INVENTION

1. Field of the Invention

This invention relates generally to servo valves for operating hydraulic actuators, and, more specifically, to those servovalves used in safety-critical applications or in force control applications or in acceleration control applications.

2. Background

Servo mechanisms are used to move aircraft control surfaces, to position machine tools, to move robotic manipulators, to simulate earthquakes, to test noise, vibration, to test harshness characteristics of vehicles, as energy sources for geophysical exploration, to grind eyeglass lenses, to move flight simulator cabins, to provide tactile feedback to joy sticks, to control pavement breaking machines, and for many other applications. Precision servo hydraulic actuators are typically controlled by servovalves. Non-precision actuators are typically controlled by similar but less expensive Proportional Valves. The following discussion will specifically address servovalves, but may apply equally well to proportional valves. Hereinafter, the term "servovalve" should be taken to include the so-called proportional valves.

In a typical form, a servovalve includes a spool valve which receives a flow of fluid from a source through one or more pressurized inlet ports, and whose position along its axis is controlled by variable volumes of fluid in two differential control chambers. These control chambers receive pressurized fluid from a prior stage of the servovalve. A difference in hydraulic force (defined as P×A, where P=Pressure and A=Area) between the two control chambers tends to accelerate the spool toward the chamber with lower hydraulic force. Two differential outlet ports are provided in a four-way valve for delivering pressurized fluid to either one of the opposite chambers of a linear actuator that includes a bidirectional piston mounted in a dual-chamber cylinder. The valve further includes at least one fluid return port that communicates with a fluid reservoir.

A conventional spool valve includes a spool having spaced-apart lands which is mounted for linear motion in opposite directions within a bore in a valve body. With the spool shifted to a first position, one or more pressurized fluid inlet ports are placed into hydraulic communication through a first outlet port with a first chamber of the actuator. Simultaneously, one or more low pressure fluid return ports are placed into hydraulic communication through a second outlet port with the opposite chamber of the actuator, thereby tending to move the actuator piston in one direction to change the position of a load which may be mechanically coupled to the actuator. Commonly, the instantaneous displacements of both the spool and the load are monitored by a Linear Variable Differential Transformer (LVDT) of any well-known type, or a Hall-effect position transducer, or a magnetostrictive transducer.

The actuator piston is urged to move in an opposite direction by shifting the servovalve spool in the opposite direction whereby one or more pressurized fluid inlet ports are placed into hydraulic communication through the second outlet port with the second chamber of the actuator. Simultaneously, one or more low pressure fluid return ports are placed into hydraulic communication through the first outlet port with the first chamber of the actuator, tending to move the actuator piston and connected load in the opposite direction.

The control law used in conventional flow control servovalves is to ideally make hydraulic fluid flow rate proportional to an input signal. The polarity of the input signal determines the direction in which the servovalve spool will move, while the magnitude of the input signal determines the velocity and displacement of spool movement. The magnitude of spool displacement from the center "null" position determines the magnitude of hydraulic fluid flow through the outlet ports. In the ideal case, which ignores flow restrictions, loading effects and variations in differential pressure across spool lands, flow from the outlet ports is proportional to the input signal.

The servo system may employ two stages in which the first stage is a torque motor which in turn controls the positioning of the valve spool of a second stage, which directly controls the actuator. To produce or control large dynamic loads, a third stage of amplification may be added as is well known. Thus in a multistage servovalve, the output stage is driven directly by one or more previous stages.

By Newton's third law, the actuator applies force to the load and the load applies equal and opposite force to the actuator. In order to operate on, e.g., move or rotate, a given load, the actuator force must be greater than the load force. The actuator force may be directly calculated by multiplying the hydraulic pressure on each side of the actuator piston by the piston area exposed to that pressure, and taking the difference of the two products, i.e., Actuator Force=(Pressure 1×Area 1)−(Pressure 2×Area 2) where Pressure 1 and Area 1 correspond to the pressure applied to and the area of a first side of the actuator piston and Pressure 2 and Area 2 correspond to the pressure applied to and the area of a second side of the actuator piston. For a typical control problem this equation may be simplified to: Actuator Force is proportional to (Pressure1−Pressure2)×Area Ratio, where the Area Ratio is the ratio of Area 1 to Area 2. Thus, this is the differential pressure times the piston area ratio. When the piston area exposed to hydraulic pressure is the same on both sides, the Area Ratio is 1. Otherwise, the Actuator Force is asymmetric, resulting in unequal force gain on oppositely directed strokes.

Since the hydraulic pressure on each side of an actuator piston is in direct fluid communication with its respective output port of a servovalve, actuator pressure may be measured either at the actuator or at the servovalve. The measurement site may be selected for convenience.

In some applications, whether the actuator piston Area Ratio is 1 or another value, force asymmetry might be caused by an asymmetric loading of the actuator. For example, an actuator which is oriented to move in a vertical axis and which supports a heavy load has load asymmetry caused by the force of gravity on the load. The gravitational force on the load increases pressure on the bottom side of the actuator piston in the quiescent state when the load is supported by hydraulic fluid. The quiescent state may be envisioned as a hydraulic lift which supports a load. An example of this situation is a machine which supports and shakes an automobile for noise, vibration and harshness (NVH) testing.

In other applications, force asymmetry may occur due to the actuator driving a nonlinear load, such as where the load is a nonlinearly compressible material, such as limestone.

The above described asymmetries tend to cause undesirable nonlinear distortion in an actuator's dynamic output. They tend to cause significant even-order harmonic distortion, and also odd order harmonic distortion. There is thus a need for a servo control system capable of compensating for force asymmetries related to a force servo actuator.

Servovalves typically have an initial transduction stage which changes a digital or analog electrical signal into a hydraulic signal. This transduction stage it typically followed by one or two stages of hydraulic amplification. Including the transduction stage, these are referred in the art as two-stage and three-stage servovalves. Proportional valves may have similarly configured stages and perform a function similar to servovalves, typically at lower cost and lower performance. Hereinafter, reference to servovalves should be understood to also include proportional valves.

For example, a servovalve hydraulic amplification stage might have a gain of 40 if its output flow rate is 40 times its input (command) flow rate. At the output ports A and B of a typical two-stage or three-stage four-way servovalve, pressurized fluid flows out port A at a commanded rate while fluid simultaneously flows into port B at a similar rate. Both fluid flows can also be simultaneously blocked, or reversed in direction. Fluid which the servovalve outputs is supplied by a pump, and fluid which it inputs goes typically to a reservoir from which the fluid subsequently returns to the pump. Filters, coolers, pulsation dampeners and numerous other devices well known in the art may be included in the hydraulic system.

A servovalve controls the rate at which it outputs and inputs fluid by controlling the position of its spool in a sleeve or bore. The spool is a device which moves along its central axis to control the opening and closing of four variable orifices. The spool has a center null position in which no fluid flows except for leakage. It can move one direction or the other from the null position in order to output fluid from output port A or B at a flow rate determined by its displacement from the null position.

In order to accurately control flow rate, a servovalve must accurately monitor and control the position of its output spool. In a two-stage servovalve, the monitoring function is typically done by a spring wire. In a three-stage servovalve, the monitoring function is typically done by a linear variable differential transformer (LVDT). Other well known types of position monitoring devices are sometimes used instead.

Sometimes a monitoring spring wire breaks, and sometimes an LVDT electrical cable develops a fault. If the monitoring device becomes inoperable for any reason, the servovalve cannot control the output spool position. The typical result of such a failure is extreme and erratic changes in output spool position resulting in maximal and unpredictable effects on the load. This sort of failure can sometimes cause catastrophic results.

Hydraulic pressure feedback serves as an auxiliary servovalve output spool position feedback in addition to its other functions. When the output spool is not in the null position, pressure feedback tends to push it back to null. Differential hydraulic pressure feedback (PFB) provides a restoring force, a negative feedback, and thus prevents erratic servovalve behavior in case the primary valve spool position feedback subsystem fails. A servovalve with PFB and with a failed primary valve spool position feedback subsystem tends to return its valve spool to null, gracefully stopping the actuator wherever it may be and preventing erratic and catastrophic motions.

The FAA has reportedly mandated that all early production Boeing 737 aircraft be modified to prevent an "uncommanded roll" failure reported by the Seattle Times to be the result of a servovalve feedback failure. Boeing's approach to the problem is to replace single-rudder tails with dual-rudder tails for redundancy. The same newspaper reported an incident of a Boeing 747 elevator failure, possibly caused by the same sort of servovalve failure. A seismic vibrator owned by a multinational oil company was reported to have separated the top of the passenger cabin from the vehicle during violent shaking caused by a servovalve spool position feedback failure. While these incidents may be rare, they do happen, and the potential catastrophic results merit considering possible solutions.

3. Discussion of Related Art

P. F. Hayner, in U.S. Pat. No. 3,260,273, issued Jul. 12, 1966, entitled Motor Valve having Differential Pressure Feedback, teaches a pressure control hydraulic servovalve wherein a pilot valve positions a control valve member to control the application of fluid under pressure through an outlet in the control valve to provide an output differential pressure across an output actuator device. The differential pressure developed across the output actuator is coupled back to a movable pilot valve member to produce a substantially constant pressure across the actuator device.

U.S. Pat. No. 3,479,925, issued Nov. 25, 1969 to P. F. Hayner and D. G. Eldridge, entitled Hydraulic Signal and Summing System, discloses a pneumatic or hydraulic control system for controlling fluid pressure and flow to an actuator so that the actuator is controlled in accordance with a predetermined function of a plurality of fluid pressure signals. The fluid pressure signals are converted to mechanical forces which are applied to the mechanical structure which directly controls fluid flow from two or more nozzles producing a pressure differential representative of the predetermined function. This pressure differential is employed to meter the fluid pressure and/or flow to the actuator.

U.S. Pat. No. 4,372,193 issued Feb. 8, 1983 to L. R. Hall, entitled System with Constant Force Actuator, teaches a method of maintaining a constant force on an actuator by controlling a pilot differential pressure on the two ends of a pilot operated control valve. The technique passes excess flow to a downstream control valve.

U.S. Pat. No. 4,537,077 issued Aug. 26, 1985 to A. J. Clark and D. N. Maue, entitled Load Dynamics Compensation Circuit for Servohydraulic Control Systems, teaches an electronic compensation circuit which compensates for disturbance factors resulting from forces exerted by a specimen on an actuator. The compensation signal is an anticipatory signal compensating for the load dynamics of a test article on a vibratory test machine.

U.S. Pat. No. 5,128,908 issued Jul. 7, 1992 to D. K. Reust, entitled Pressure Feedback Servovalve for a Seismic Vibrator, teaches a method for reducing harmonic distortion associated with a hydraulic seismic vibrator apparatus using symmetric pressure feedback control. The patent teaches a method for converting the third stage of a three stage servovalve into a pressure control servovalve. The servovalve is converted into a pressure control valve by porting differential negative pressure feedback from the hydraulic output ports of the main stage. The pressure feedback is a differential flow of hydraulic fluid through two passageways based upon the differential pressure applied to the piston of the vibrator actuator. The differential pressure applied to the piston represents the load on the servovalve. The amount of feedback applied is determined by orifices in the feedback passageways. Hydraulic damping of the load is achieved by providing a restricted hydraulic path between the two output ports of the servovalve. The amount of damping is determined by an orifice.

The apparatus of the '908 patent is designed specifically for use on a seismic vibrator as used in geophysical exploration. Although this reference teaches structure for providing differential negative pressure feedback, it does not teach means for accommodating known or postulated force asymmetries related to the load actuator. More specifically, it does not teach or suggest providing hydraulic fluid feedback using fluid passageways in an intermediate land of the spool.

U.S. Pat. No. 5,230,272 issued Jul. 27, 1993 to J. Schmitz entitled Hydraulic Positioning Drive with Pressure and Position Feedback Control, discloses a hydraulic drive actuated by a CNC means. The feedback to an electronic servo amplifier may be switched to actuator position or actuator pressure.

U.S. Pat. No. 5,522,301 issued Jun. 4, 1996 to J. E. Roth, et. al. entitled Pressure Control Valve for a Hydraulic Actuator, describes a servovalve assembly for accommodating asymmetrical loading characteristic of unequal area pistons. This patent teaches use of two three-way servovalves, one valve being coupled to the load line of each chamber of the actuator. Asymmetrical actuator loading is compensated for by use of field-replaceable cartridges 82A and 82B characterized by a sleeve portion 220 and a spool 222 (FIGS. 4A, 4B and 6 of the '301 patent). The cartridges are installed in the respective servo valves with the spool portion of the cartridge in engagement with a land on the end of the spool of the servovalve. The differential force applied to the two cartridges multiplied by the ratio of their respective end areas dictates the force applied to the actuator piston. The force is a function of the surface area of one end of the cartridge spool and the pressure in the control passageway. Therefore, by increasing (or decreasing) the diameter of the cartridge spool portion the force applied by the cartridge to the spool and the force on the piston increases (or decreases). (See col. 9, lines 1-21). Restrictions 138A and 138B (FIG. 4A) provide damping.

U.S. Pat. No. 6,629,733, issued Aug. 7, 2001, to Dennis K. Reust, entitled Force Servo Actuator with Asymmetrical Nonlinear Differential Hydraulic Force Feedback, the entire contents of which are herein incorporated by reference, teaches a hydraulic force servo system which provides an apparatus for compensating for unequal loading forces applied to an actuator piston, and for unequal areas on opposite faces of the piston. Asymmetric nonlinear differential hydraulic force feedback from the output side of a force servovalve is summed with the hydraulic control signal inputs to the output stage of the servovalve at hydraulic summing junctions. Impedances offered by orifices in the feedback lines determine the amount of feedback. Nonlinear characteristics of the feedback method serve to compensate for nonlinearities in the servo actuator and system. The impedance ratio of the orifices is selected as a function of the known or postulated asymmetry of the loading forces to be applied to the actuator piston, and the ratio of the areas of the opposing faces of the actuator piston. Hydraulic damping further improves linearity and stability.

Notwithstanding the related art, there remains a need for a means to inexpensively create fail-safe servovalves, and further decrease the delay in pressure feedback control loops, and reduce cavitations inside servovalve bodies.

SUMMARY OF THE DISCLOSURE

The present disclosure is directed to implementing pressure feedback, linear or non-linear, in a servovalve by placing one or more fluid passageways and optionally jets within the fluid passageways, into the central or intermediate land of the servovalve's main spool. As will be readily appreciated from the instant application, said fluid passageways and jets, if provided within the fluid passageways, provide at least two desirable effects: (1) symmetric differential hydraulic pressure feedback, and (2) damping. Pressure feedback is applied in the optimal location and effects a restorative function on servovalve spool displacement with minimum delay. Minimum delay enables maximal closed-loop bandwidth and higher gain. This method of pressure feedback application does not sum directly with the hydraulic input signal to the main valve stage, and therefore does not affect the boost pressure (the average pressure of the input signal). In addition, the fluid passageway and jet provides damping. Damping enhances stability and may reduce cavitation of the servovalve body. These fluid passageways are in optimal proximity to the typical sites of servovalve cavitation.

Optional embodiments to the novel pressure feedback technique include, but are not limited to: (1) supplementing damping by arranging a fluid passageway which causes an attenuated shunt of differential cylinder pressure in an attached manifold, or in the servovalve body, or in the piston of the driven actuator; (2) supplementing pressure feedback by positioning one or more pressure feedback orifices in an attached manifold or in the valve body; (3) making pressure feedback asymmetric by adding only one supplemental orifice or by adding at least two orifices but providing that one has greater resistance to flow than the other; (4) optionally adding in series to fixed pressure feedback orifices, adjustable orifices; or (5) optionally adding in series to fixed pressure feedback orifices hydraulic filters.

The hydraulic servo control system used in the present disclosure acts on an actuator piston which is subject to force asymmetries and which is mounted in a dual-chamber cylinder for bi-directionally moving a load in oppositely-directed strokes. The servo control system includes a spool wherein its position along its axis is controlled by volumes of fluid in two opposed control signal input ports. The spool valve has at least one inlet port for receiving a flow of pressurized fluid, at least one return port, and at least one outlet port for delivering pressurized fluid to the actuator cylinder. One or more fluid passageways and jets, if provided therein, are machined or otherwise formed in the central or intermediate land of the servovalve main spool of a traditional hydraulic flow control servovalve. The affect of the fluid passageway on a servo actuator is to change it from a velocity or position control actuator essentially into a force or acceleration control actuator.

In another aspect of the present disclosure, the servo control system may optionally include hydraulic means for compensating for any known or postulated force asymmetry related to the actuator. The hydraulic means is characterized by fluid passageways for providing negative nonlinear hydraulic force feedback communication between the outlet ports and control signal input ports and orifices in the fluid passageways having preselected but unequal hydraulic force feedback impedances. The impedance values are preselected as a function of the known or postulated force asymmetry.

The servovalve controls fluid pressure to the dual-chamber force servo actuator cylinder, and includes a first and a second hydraulic control-signal input port to the final stage, a high pressure port and at least one return port. The servovalve further includes first and second fluid outlet ports in fluid communication with the respective actuator cylinder chambers for applying hydraulic fluid under pressure to the opposite faces of the actuator piston during alternate cycles.

In a preferred embodiment of the present disclosure, the servo control system can be provided with hydraulic means for compensating for known or postulated force asymmetries. A first fluid passageway provides hydraulic force feedback communication between the first outlet port and the second input port. A second fluid passageway provides hydraulic force feedback communication between the second outlet port and the first input port. A first fixed orifice in the first fluid passageway and a first variable orifice spaced from the first fixed orifice cooperate to provide a first preselected force feedback impedance, while a second fixed orifice in the second fluid passageway and a second variable orifice spaced from the second fixed orifice cooperate to provide a second preselected force feedback impedance. The impedance values may be unequal and are derived as a function of the force asymmetry related to the actuator.

In connection with one aspect of the disclosure, the force asymmetry arises from a difference in the exposed areas on the opposite faces of the actuator piston. In this circumstance, the preselected impedance values are a function of the ratio of the areas of the exposed surface areas of the opposite faces of the actuator piston. The orifice in fluid communication with the chamber having the piston face with the higher exposed surface area will generally have a preselected hydraulic force feedback impedance value less than that of the other orifice.

In connection with another aspect of the disclosure, the force asymmetry arises from an asymmetric loading of the actuator. In this circumstance the preselected hydraulic force feedback impedance values are a function of the ratio of load forces applied to the opposite faces of the actuator piston during the oppositely directed strokes.

In connection with still another aspect of the disclosure, the force asymmetry arises from the driving of a nonlinear load, wherein the preselected hydraulic force feedback impedance values are a function of the changing load forces.

In a preferred embodiment of the present disclosure, the central or intermediate land of the spool includes one or more fluid passageways extending through the intermediate land of the spool, parallel to the central axis, to thereby provide feedback and damping, and also to reduce feedback response time.

Additional Features of the Present Disclosure

Adding even a small amount of hydraulic pressure feedback (PFB) makes a servovalve or proportional valve fail safely rather than catastrophically when valve spool position feedback is disrupted, thereby making the servovalve or proportional valve fail-safe.

A fail-safe servovalve or proportional valve can be made more robust and trouble-free by applying PFB through screened orifices and/or by limiting the maximum amplitude of PFB which may be applied. A fail-safe servovalve or proportional valve can be made to operate with greater stability by applying at least a small amount of hydraulic damping. A fail-safe servovalve or proportional valve is disclosed, where the maximum amplitude of hydraulic damping which may be applied is limited in order to preserve efficiency and robustness.

A fail-safe servovalve or proportional valve can be fitted with fixed supplemental PFB orifices in series with adjustable PFB orifices for easy adjustment within preset limits for robustness. A fail-safe servovalve or proportional valve can be fitted with a fixed supplemental hydraulic damping orifice in series with an adjustable damping orifice for easy adjustment within preset limits for robustness.

A fail-safe servovalve or proportional valve can be fitted with a fluid passageway machined into and through the side walls of the main spool intermediate land for direct hydraulic PFB and for damping with minimal delay and to reduce cavitation inside the servovalve. Similarly, a hydraulic actuation cylinder driven by a fail-safe servovalve is disclosed, wherein the fluid passageway is machined into the side walls of the cylinder piston for effective damping at the point of load and to reduce cavitations inside the cylinder. Supplemental damping can be provided by a fluid passageway machined, or otherwise fitted within (1) a manifold, (2) the valve body, or (3) the actuator piston.

A fail-safe servovalve or proportional valve can be adapted to an asymmetric actuator by applying asymmetric pressure feedback by using a different impedance values in one fluid passageway relative to another fluid passageway.

A fail-safe servovalve or proportional valve can be adapted to an actual or anticipated asymmetric load on an actuator by applying asymmetric pressure feedback by using a different impedance values in one supplemental PFB port compared to the other.

A fail-safe servovalve can be used on a seismic vibrator. The seismic vibrator can have a fluid passageway and a jet, if provided within the fluid passageway, machined into the side walls of its actuator piston.

A fail-safe servovalve or proportional valve constructed in accordance with the present disclosure can also be used on: a ship, submarine, boat, or other water-borne vessel; a fixed-wing aircraft or rotary wing aircraft; an earthquake simulator; a noise, vibration, and harshness testing machine; a flight simulator; and the like.

A two-stage servovalve can have supplemental PFB and hydraulic damping orifices situated in a manifold; in the spool end caps; in fittings attached to the spool end caps; and the like.

A three-stage servovalve can have supplemental PFB and hydraulic damping orifices situated in a manifold; in the spool end caps; in fittings attached to the spool end caps; and the like.

A fail-safe auxiliary valve spool centering system can be added to servovalves for reasonable cost. The auxiliary system has no moving parts and is not prone to failure.

A servovalve's output spool is moved back and forth in its bore or sleeve by differential hydraulic pressure on the spool end surfaces. The differential pressure is supplied by the previous hydraulic stage, either the initial transduction stage or the second stage in the case of a three-stage servovalve. This differential hydraulic driving signal is referred to hereinafter as the hydraulic input signal (HIS). In an aspect of the disclosure, the differential pressure at a servovalve's output ports A and B is sampled and used as the auxiliary valve spool monitoring subsystem. This feedback signal is referred to hereinafter as differential hydraulic pressure feedback (PFB). In an aspect of the disclosure, PFB is not converted to an electrical signal, but remains a hydraulic signal for maximum reliability and minimum delay and therefore wide closed-loop bandwidth.

The flow through the fluid passageways machined into the intermediate land of the valve spool provides significant thrust ranging to several hundred pounds force. This thrust is a direct and immediate result of differential pressure across the servovalve output ports and thus the intermediate land of the spool. This thrust is a restorative force which directly acts as a negative feedback to differential pressure. The thrust acts to counteract the net control force at the spool ends and therefore form an algebraic summation of pressure feedback with the HIS.

Supplemental PFB orifices may optionally be added to enhance and/or change the symmetry of PFB. PFB and optional supplemental PFB are metered by fixed and/or variable orifices and summed with the HIS, changing the differential pressure applied to the ends of the servovalve output spool. PFB is applied in such a way that it provides a negative feedback, a restoring force to the output spool, tending to return it to null position. This restorative feedback approximately replicates the function of the typical valve spool position monitoring and control subsystem. The PFB is not prone to failure, as it has no feedback springs, no moving parts, and no electrical circuits. It consists of hydraulic fluid passageways and fixed and/or variable orifices and mounting provisions for these. For maximum reliability, drilled steel orifices are preferred over jeweled orifices because the latter have a failure mode of ejecting the jeweled orifice under over-pressure.

PFB is not prone to the industry-known problem known as "silting" because flow through its orifices is bi-directional. Therefore, agglomerated long polymer chains which could cause silting are swept away.

In one aspect of the present disclosure, PFB is sampled at the servovalve's output ports. These output ports connect directly to an actuator such as a hydraulic cylinder or rotary actuator. For example, output port A hydraulically connects to one side of a hydraulic cylinder piston, and port B to the other side. The pressure on one cylinder piston face times the exposed area of that face equals the force applied to that side of the piston. Likewise, the pressure on the opposite face of the cylinder piston multiplied by the exposed area of that face equals the force applied to that side of the piston. Ignoring friction, leakage and other loss mechanisms, the differential force across the cylinder (actuator) piston faces equals the actuator force. The force of the actuator is applied to its load, and vice-versa. The load force is reflected to the servovalve as differential pressure. This pressure, attenuated by orifices, is used as PFB.

High frequency resonances in the actuator or load may tend to cause system instability. These resonances may be damped out by a fluid passageway, either in the actuator cylinder or in a manifold or in the intermediate land of the spool of the servovalve. The fluid passageway is configured as a restricted flow passageway from servovalve output port A to B and/or as a restricted flow passageway across or through the cylinder piston.

Each supplemental PFB orifice and supplemental damping orifice may be either a fixed orifice or a variable orifice such as a needle valve or pin valve. To make a hydraulic system both flexible and robust, each supplemental PFB orifice and supplemental damping orifice may be configured as a fixed orifice in series with an adjustable orifice.

Where it is desirable to make PFB asymmetric, fixed and/or adjustable supplemental orifices may be arranged to supply different flow restriction to the feedback from servovalve port A with respect to port B. Using variable orifices is handy for fine-tuning a system after installation. Using only fixed orifices makes it less likely that an unskilled or unintentional operator will misadjust the system.

A better understanding of the present disclosure, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTIONS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

General Description of a Servovalve Assembly

Figure 1:
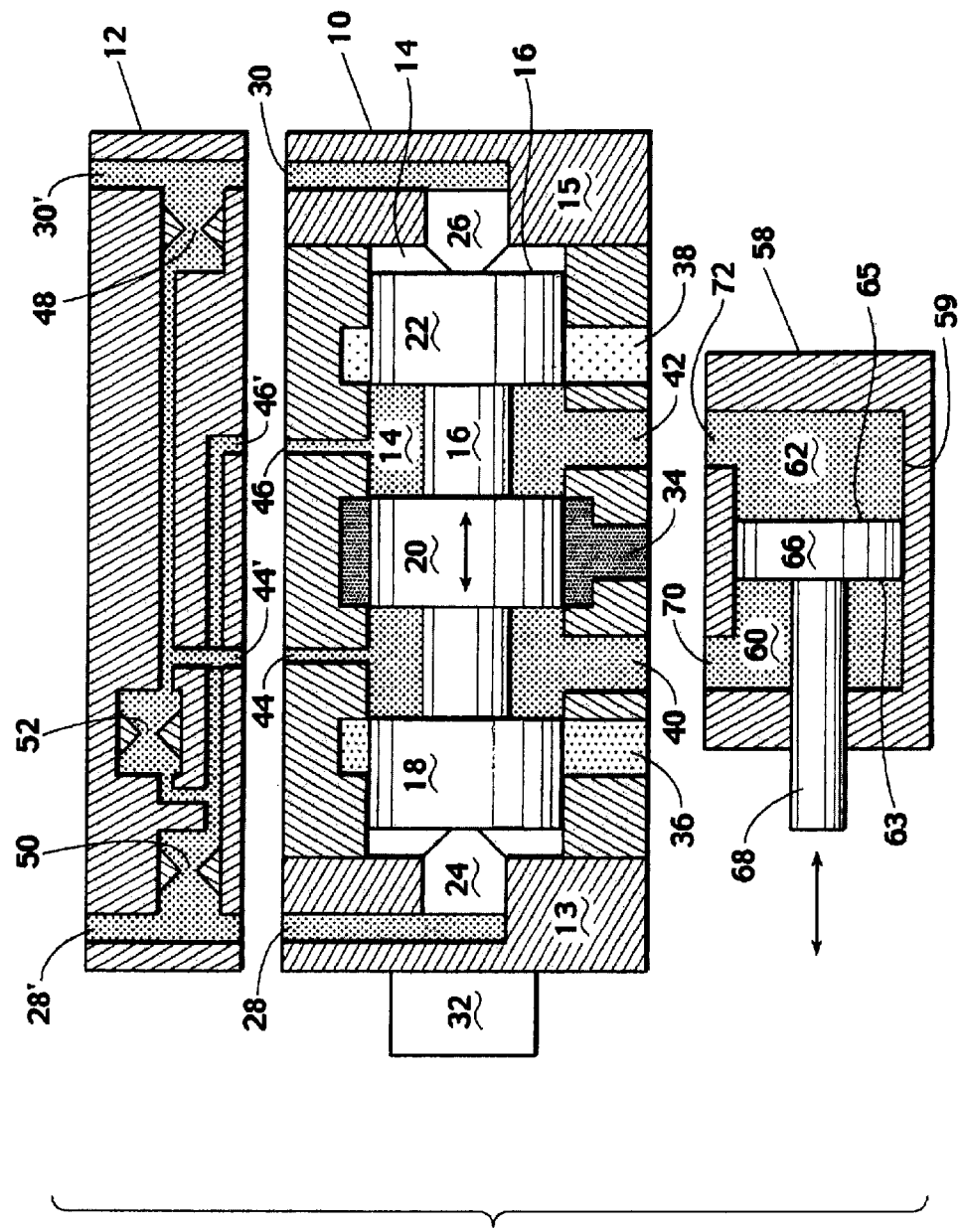
FIG. 1 is a schematic showing of a hydraulic servo control system including a manifold and the final stage of a multistage four-way servovalve constructed in accordance with the prior art.
Figure 2:
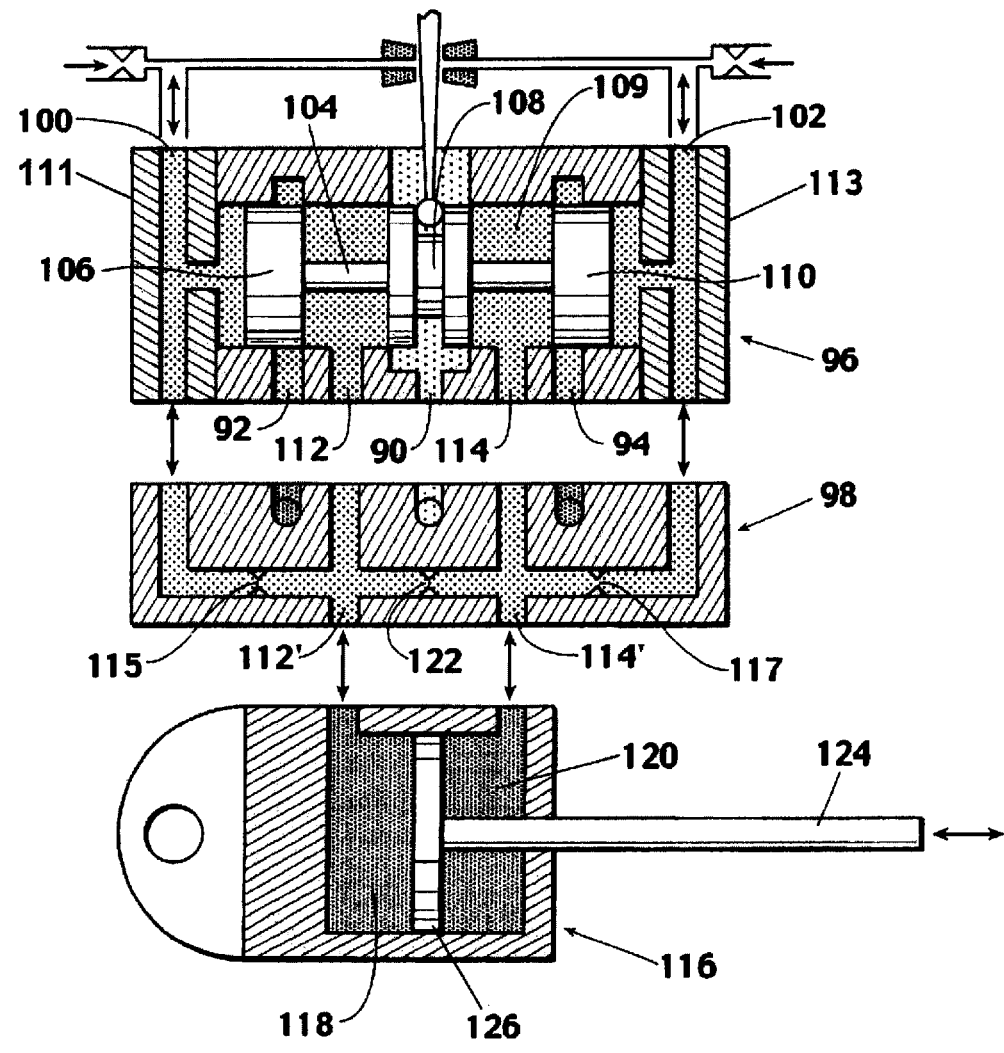
FIG. 2 is a schematic showing of a two-stage four-way servovalve in a hydraulic servo control system including a flapper nozzle hydro-amplifier, a main valve stage, a manifold, and an actuator piston with asymmetry in the areas of its two piston faces constructed in accordance with the prior art.

Provided now is a general description of a servovalve assembly shown in FIGS. 1 and 2 known in the art and capable of being used in conjunction with the inventive aspects of the present disclosure. It is to be understood that the following general description is not limiting of the present disclosure. That is, the inventive concepts of the present disclosure can be used in any servovalve assembly including a spool, as is known in the art and described below.

Referring now to the drawings, wherein like reference numerals designate identical or corresponding parts throughout the several views, and with particular reference to FIG. 1, there is shown an exploded schematic view of a servo system including a conventional flow control servovalve body, generally shown as 10 (with added force sensing ports 44 and 46), which may constitute the main stage of a multistage servovalve. An optional manifold 12 provides plumbing and provisions for orifices required for adding supplemental damping or PFB, or for changing the feedback symmetry. Valve body 10 includes a longitudinal bore 14 that is closed at each end by end caps 13 and 15. A spool 16 having lands 18, 20, and 22 is mounted for linear motion within bore 14 when urged by one of the two optional pressure-actuated equal area stub shafts 24 or 26 that are mounted in the respective end caps 13 and 15. Spool 16 is shown in the neutral or "null" position with all pressure and return ports blocked. When the hydraulic force applied to one stub shaft 24 or 26 through its respective control port (28 and 30) from a control means (not shown) exceeds the force applied to the other stub shaft, the spool 16 is urged to move toward the stub shaft with less control force. The position of the spool 16 is sensed by a displacement transducer 32 of any desired type as earlier mentioned.

Valve body 10 includes a central high pressure port 34 that is coupled to a source of pressurized fluid (not shown) and two laterally bifurcated return ports 36 and 38 that may be connected in parallel to a fluid reservoir of any conventional type (not shown). The return ports 36 and 38 may, of course, also be internally connected so that only a single return port penetrates the valve body.

The fluid flow from the valve body 10 acts upon a force servo actuator, generally shown as 58. Force servo actuator 58, which is shown as a linear actuator but which may be rotary, consists of a cylindrical body 59 in which is slidingly mounted a piston 66 and piston rod 68 that may be coupled to a desired load (not shown). Piston 66 separates the cylinder 59 into dual chambers 60 and 62, also referred to as first and second actuator chambers 60 and 62. Outlet ports 40 and 42 of servovalve 10 fluidly communicate with chambers 60 and 62 via actuator ports 70 and 72, also referred to as first and second actuator ports 70 and 72, respectively. Because of the presence of a single piston rod 68, the opposing faces of piston 66 have unequal areas.

Sensing ports 44 and 46 in valve body 10 provide samples of the pressures applied to the opposing sides of the actuator piston 66. As previously stated, optional manifold 12, which includes first and second control signal input ports 28' and 30' and fluid passageways 44' and 46', is operatively coupled to valve body 10 so that the complementary ports and passageways are aligned for fluid communication as indicated.

A first fluid passageway 44' in the manifold 12 provides negative hydraulic force feedback communication between first outlet port 40 and second control signal input port 30-30'. A second fluid passageway 46' provides negative hydraulic force feedback communication between second outlet port 42 and first control signal input ports 28-28'. The fluid passageways thus provide an algebraic summing junction for the control signal and the output sensing signals. The negative feedback provides a restoring force to the servovalve spool in opposition to the urging of the control signal input force against the opposing fixed area stub shafts 24, 26.

Valve body 10 may be of any well-known commercial design for the final stage of a multistage servovalve. Manifold 12 is configured to match the physical design features of the valve with which it will be used.

A first orifice 48, mounted in first fluid passageway 44' of manifold 12, offers a first preselected negative hydraulic force feedback impedance, whereas a second orifice 50 mounted in second fluid passageway 46' offers a second negative hydraulic force feedback impedance. The impedance values for the first and second orifices 48 and 50 can be unequal and are selected as a function of the force asymmetry related to the force servo actuator. The unequal impedance values thus compensate for a force asymmetry by providing asymmetric nonlinear differential hydraulic force feedback between the outlet ports 40 and 42 of the servovalve 10 and the control signal input ports 28 and 30. A better understanding of a general servovalve will become apparent from the specific examples given below.

EXAMPLE 1

The force asymmetry may be caused by a difference in the exposed surface areas of an actuator piston. With reference to FIG. 1, the piston 66 has two opposed piston faces 63 and 65 of different exposed surface areas due to the presence of piston rod 68. Accordingly, face 63 has a smaller surface area than face 65. If the high pressure port 34 provides equal pressure to both chambers 60 and 62 of the actuator cylinder 58 during opposing strokes, unequal force gain is realized on oppositely directed strokes. The potential actuator force is greater on the extension stroke versus the retraction stroke, resulting in asymmetric output force. Providing asymmetric nonlinear differential hydraulic force feedback compensates for the asymmetry caused by the difference in exposed surface areas. In this example the orifice 50 used in fluid passageway 46' has a larger aperture than the orifice 48 used in fluid passageway 44'. Thus, orifice 50 provides a lesser impedance to fluid flow through passageway 46' as compared to orifice 48 and the fluid flow through passageway 44'. Consequently, a larger restoring force is provided to spool 16 during the extension stroke than the retraction stroke through the algebraic summing of the control signals and the feedback signals. With the selection of appropriate hydraulic force feedback impedance values as a function of the ratio of the exposed surface areas of the opposite faces 63 and 65 of the actuator piston 66, stroke forces may be equalized.

EXAMPLE 2

The force asymmetry may be caused by an asymmetrical loading of the force servo actuator. In an NVH testing machine discussed above, which is oriented to move in a vertical axis and which supports a heavy load, a load asymmetry is caused by the force of gravity on the load. The gravitational force on the load increases pressure on the bottom side of the actuator piston in the quiescent state when the load is supported by hydraulic fluid. The optional manifold 12 described above is able to compensate for the asymmetry caused by the differing load forces. Now referring to FIG. 1 for explanation, and supposing that the force servo actuator 58 is supporting a heavy load for movement in a vertical axis, the orifice 48 used in fluid passageway 44' has a larger aperture than the orifice 50 used in fluid passageway 46'. Thus, orifice 48 provides a lesser impedance to fluid flow through passageway 44' as compared to orifice 50 and the fluid flow through passageway 46'. Consequently, compensating forces are provided to spool 16 through the algebraic summing of the control signals and the feedback signals. With the selection of appropriate hydraulic force feedback impedance values (i.e., orifice aperture sizes and ratios) as a function of the ratio of the known or postulated loading forces, actuator forces may be equalized.

EXAMPLE 3

The force asymmetry may be due to the actuator driving a nonlinear load such as a seismic vibrator on a limestone surface. The optional manifold 12 is able to compensate for the asymmetry caused by the changing mechanical advantage. With the selection of appropriate feedback hydraulic force impedance values (i.e., orifice aperture sizes and ratios) as a function of the ratio of the known or postulated changes in mechanical advantage, compensating forces are provided to spool 16.

The foregoing examples are merely illustrative in nature and are fairly simple for explanatory purposes. It should be understood, however, that the manifold 12 encompasses compensating for one, or combinations of more than one known or postulated force asymmetry at work in a specific application. The optional manifold 12 in its broadest sense also encompasses the purposeful control or management of force asymmetries to achieve desired objectives which may not include the complete cancellation or full compensation of the asymmetry. That is, the manifold 12 also contemplates purposefully providing an asymmetry in an otherwise symmetric servo control system should the asymmetry achieve a desired goal.

As would be understood in the art, a supplemental damping orifice 52 of FIG. 1 may be installed between first and second fluid passageways 44' and 46'.

The orifices discussed above may be obtained commercially from, for example, The Lee Company of Westbrook, Conn. An alternate source may be Bird Precision of Waltham, Mass. Another source may be O'Keefe Controls Co. of Monroe, Conn. The Lee Company makes orifices of a more complicated design with multiple staged orifices, which approximate simple orifices. This discussion within this disclosure will consider all orifices to be simple for the sake of clarity. However, such discussion should not be considered limiting and the present disclosure can be used with more complex orifices. Preferably, the apertures of orifices 48 and 50 (and also orifice 88 described below) may lie in the range of about 0.004 inch to 0.040 inch in diameter. The aperture of supplemental damping orifice 52 may range from zero (no orifice or a solid plug) to about 0.059 inch in diameter. In general, the larger orifices are used for high flow three-stage servovalves capable of supplying more than 100 gallons per minute. Two stage servovalves with flow rates on the order of 5 gallons per minute employ smaller sizes. As used herein the phrase "hydraulic force feedback impedance value" refers generally to the ability to physically impede a fluid flow and is not limited to any particular denomination.

Thus, as would be readily understood in the art, changes in the orifice aperture sizes and ratio would also change the amount of feedback provided thereby. Thus, the precise orifice aperture sizes and ratio would be determined based on an intended application, i.e., the amount of feedback desired for the application. Accordingly, quantitative design of the orifice aperture sizes and ratio may readily be determined empirically.

In accordance with one aspect of the present disclosure, an alternative to the use of replaceable orifices 48, 50 and 52, variable orifices, such as pin or needle valves, might be used for any or all of the three orifices. The use of variable orifices makes empirical set-up of feedback impedances easier and faster. Commercially available needle valves and micrometer needle valves are known to be an acceptable substitute. As used herein the term "orifice" includes not only a separable physical object having an aperture therethrough, but also an aperture or passageway which functions by itself to provide an impedance to fluid flow. For example, and with reference to FIG. 1, it is to be understood that fluid passageways 44-44' and 46-46' are constructed of differing diameters to take into account a known or postulated force asymmetry without requiring the use of a physically separable object for impedance. It is preferred for convenience of manufacture, however, that the fluid passageways 44-44' and 46-46' be of a common diameter. It is also preferred to use "knife edge" orifices, so the system will be less sensitive to fluid viscosity changes with temperature.

Fortunately, the feedback method includes nonlinearities similar to those in the servovalve. The feedback itself helps compensate and cancel the nonlinearities in the servovalve and actuator. Even a linear feedback system helps cancel those nonlinearities, but existing technology for designing such a linear feedback system has limitations in closed loop bandwidth and in the ability to accurately compensate for nonlinearities. The nonlinear feedback method described above offers much improved closed loop bandwidth and greatly improved ability to compensate the nonlinearities of a servovalve, actuator, and load.

The arrangement of FIG. 1 provides symmetric or asymmetric nonlinear differential hydraulic force feedback for a servovalve having a centrally located high pressure hydraulic fluid supply port 34 and laterally bifurcated low pressure hydraulic fluid return ports 36 and 38, as in the final stage of a multistage servovalve system. FIG. 2 shows an alternate arrangement that may be used with the output stage of a two-stage servovalve that employs a centrally located low pressure hydraulic fluid return port 90 and laterally bifurcated high pressure hydraulic fluid supply ports 92 and 94. A valve body, generally shown as 96, includes hydraulic control signal input ports 100 and 102. Spool 104, shown in the neutral position in FIG. 2, having lands 106, 108 and 110, is slidingly mounted in a bore 109 in valve body 96. Bore 109 is closed at each end by end caps 111 and 113. The output pressure ports are shown as 112 and 114. An optional manifold 98 provides negative feedback passageways and receptacles for feedback orifices 115 and 117. Through-passages 112' and 114' provide fluid flow to chambers 118 and 120 of actuator 116 which includes a single-rod piston 126 and piston rod 124.

In a simplified operational example, control pressure applied over the line 100 urges the spool 104 to the right, exposing port 114 to high pressure port 94 and causing outward pressurized fluid flow, and exposing port 112 to low pressure return port 90, causing inward fluid flow. This tends to cause a pressure increase in actuator chamber 120 and a pressure decrease in actuator chamber 118. Load force acting on piston rod 124 is proportionally reflected in the pressure in actuator chamber 120 and is fed back through orifice 117 to the outside end of valve spool piston 110. This force tends to restore spool 104 to its neutral position. Orifice 122 is a damping orifice to moderate responsiveness and ensure stability. Damping orifice 122 dampens pressure spikes such as those which may occur when piston rod 124 impacts a massive object. Damping these pressure spikes may reduce damage to the actuator and to the structure upon which the actuator is mounted, and may also reduce fluid cavitations in the actuator, a phenomenon well known to those skilled in the art as a common destructive phenomenon.

For simplicity, the operation of the servovalve assembly was explained in terms of single-ended hydraulic force feedback. In actual use, employing differential hydraulic force feedback, the system senses net load force which may be either corrected for or tempered by asymmetry, and performs compensation for a load disturbance in either direction. Thus, if the load is expected to be resisting force in one direction and a shock is impulsively applied from the other direction, the differential hydraulic force thereby will sense both the magnitude and polarity of the disturbance and cause the system to compensate. The system monitors the pressure on both sides of the actuator piston simultaneously so that hydraulic force feedback is applied to both ends of the valve spool with the end having the higher pressure dominating, and algebraically summing with the control signal pressure. The effect of the pressure feedback is nonlinearly related to the pressure difference across the actuator piston in dynamic operation, and linearly related in the static condition. The nonlinearity arises from a square root term in the relationship of fluid flow through an orifice to the pressure across the orifice.

It is to be understood that the teachings above may be applied to the input and the output side of the main stage of a servovalve having any number of stages. The servo system may include a linear or a rotary actuator. If linear, the actuator may include a single rod or a double rod piston. The servovalve may be either a three-way valve or a four-way valve. The teachings apply to use with pilot valves of the flapper-nozzle type and of the jet pipe type (not shown) and the speaker coil type (not shown) and the rotary type (not shown) and other types which may be, or may become available.

Preferred Embodiment of the Present Disclosure

Referring now to FIGS. 3-7, shown therein are preferred embodiments of a spool for a servovalve assembly constructed in accordance with the present disclosure, the spool is identified by reference numeral 200. The spool 200 is adapted to provide pressure feedback in the servovalve. In one aspect, the spool 200 provides a quicker response time when used in the servovalve 10 assembly discussed above. It should be understood that the preferred embodiment of the spool 200 can be used in conjunction with, or, instead of the manifold 12 or the manifold 98, discussed above, or in conjunction with, or instead of the preferred embodiment of the manifold 12a described below. The orifices 48 and 50 in the manifold 12 can be used to provide additional feedback when used in conjunction with the spool 200. Also, the spool 200 can be used instead of the manifold 12, the manifold 98, or the manifold 12a discussed below, wherein the spool 200 provides the feedback for the servovalve 10 assembly.

Figure 3A:
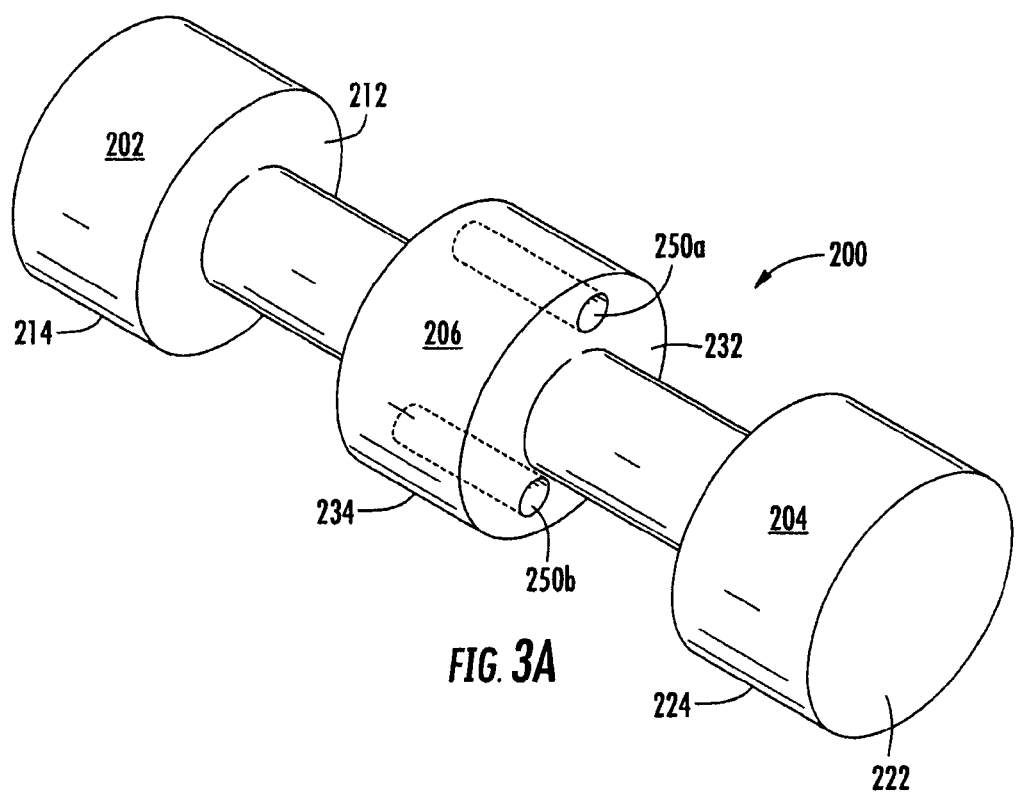
FIG. 3A is a perspective view of a preferred embodiment of a spool wherein an intermediate land includes at least one fluid passageway constructed in accordance with the present disclosure.
Figure 3B:
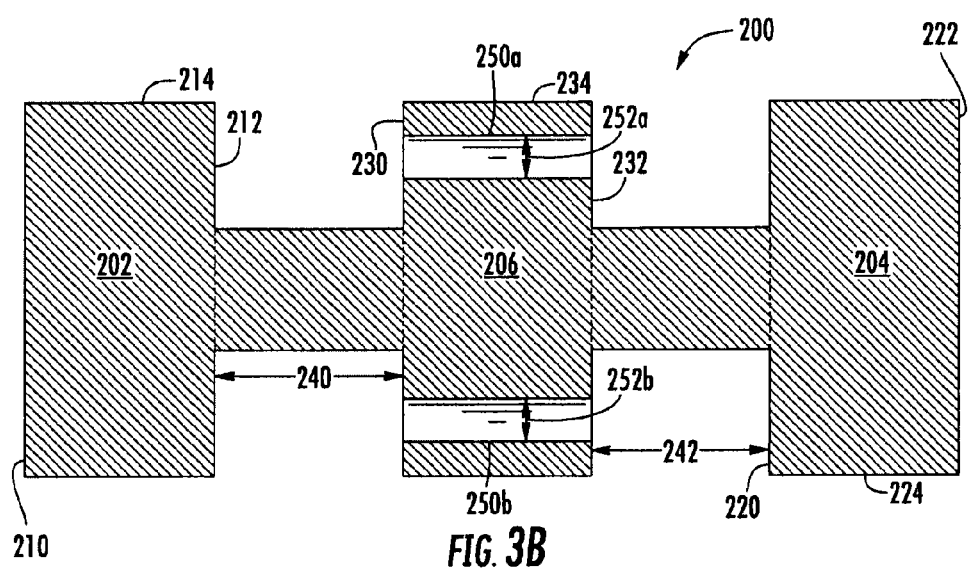
FIG. 3B is a side plan, cross-sectional view of the spool shown in FIG. 3A wherein the intermediate land of the spool includes two fluid passageways, in accordance with the present disclosure.

Referring now to FIGS. 3A and 3B, shown therein is the spool 200 constructed in accordance with the present disclosure. In particular, FIG. 3A shows a perspective view of the spool 200 wherein FIG. 3B is a cross-sectional, side plan view showing the spool 200. The spool 200 includes a first end land 202, a second end land 204, and an intermediate land 206. Although the spool 200 is shown as having one intermediate land 206, it is to be understood that the spool 200 can include more than one intermediate land 206. The first end land 202 includes a first side 210, a second side 212, and a peripheral sealing surface 214 extending from the first side 210 to the second side 212. Similarly, the second end land 204 includes a first side 220, a second side 222, and a peripheral sealing surface 224 extending from the first side 220 to the second side 222. The peripheral sealing surfaces 214 and 224 are sized and/or shaped so as to conform to the longitudinal bore 14 in the servovalve body 10 discussed above.

The intermediate land 206 includes a first side 230, a second side 232, and a sealing surface 234. The intermediate land 206 is positioned or otherwise formed between the first end land 202 and the second end land 204 in a spaced apart, axially aligned relationship wherein the first side 230 faces the first end land 202 and the second side 232 faces the second end land 204. A first annular space 240 is thereby defined between the first side 230 of the intermediate land 206 and the second side 212 of the first end land 202. A second annular space 242 is thereby defined between the second side 232 of the intermediate land 206 and the first side 220 of the second end land 204.

The intermediate land 206 further includes at least one fluid passageway 250 (two fluid passageways being shown in FIGS. 3A and 3B and identified by reference numerals 250a and 250b) extending longitudinally therethrough, i.e., between the first side 230 and the second side 232. The fluid passageway 250 includes a diameter 252, identified in FIGS. 3A and 3B by reference numerals 252a and 252b. In one aspect the diameter 252 can be uniform or otherwise constant throughout the length of the fluid passageway 250 such that the fluid passageway 250 is substantially parallel between the first and second sides 230 and 232, as shown in FIGS. 3A and 3B.

Figure 4A:
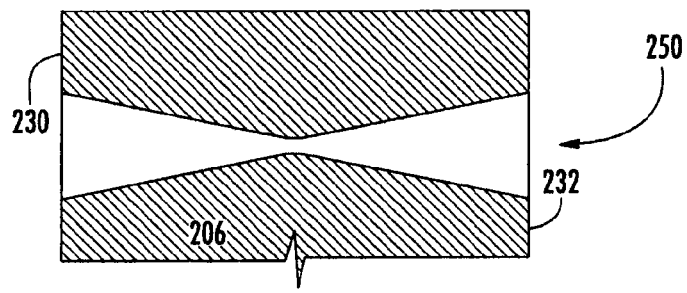
FIGS. 4A-4D are fragmental, cross-sectional views of the intermediate land of the spool showing different profiles for the fluid passageway constructed in accordance with the present disclosure.
Figure 4B:
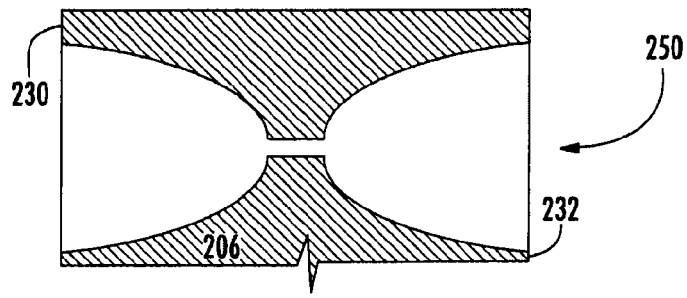
Figure 4C:
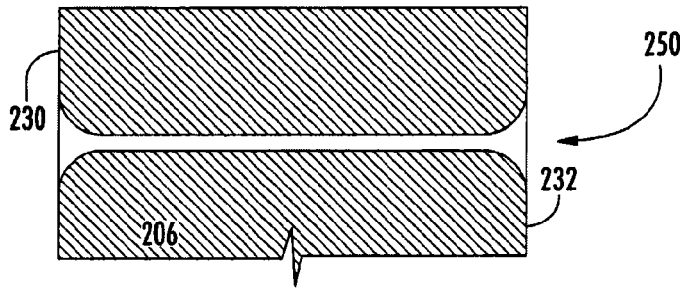
Figure 4D:
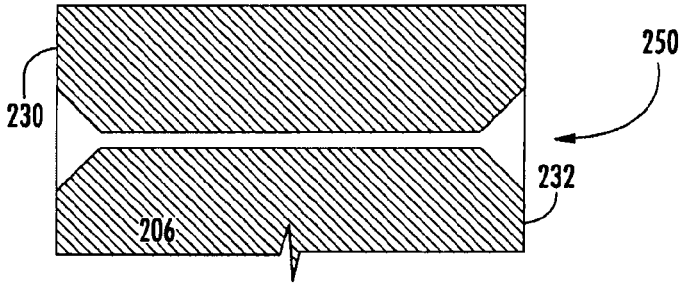

In another aspect, the diameter 252 can be substantially non-uniform throughout the length of the fluid passageway 250 such that the fluid passageway 250 is not substantially parallel. See, for example, the differing profiles of the fluid passageway 250 shown in FIGS. 4A-4D. For example, as shown in FIG. 4A, the fluid passageway 250 can include an inwardly tapering profile from the first side 230 and an inwardly tapering profile from the second side 232 wherein the inwardly tapering profiles meet approximately in the middle to thereby define a fluid restriction, e.g., similar to opposingly faced frustro-conical cones. Other profiles considered within the scope of the present disclosure include, but are not limited to, a step profile (not shown), an outer radius edge profile (FIG. 4C), an outer chamfer profile (FIG. 4D), and the like.

More particularly, although the fluid passageway 250 is shown in FIGS. 3A and 3B as being essentially a parallel channel within the intermediate land 206, it is to be understood that other shapes and/or configurations can also be employed without departing from the scope of the present disclosure. For example, the fluid passageway 250 can include flared or rounded ends to direct, or otherwise control the fluid entering or exiting the fluid passageway 250. Other configurations can include a fluid passageway 250 that is not parallel but instead includes angled or stepped sides. Any number of fluid passageway 250 configurations can be employed to achieve the desired goal of feedback without departing from the scope and intent of the present disclosure. The fluid passageway 250 can also be formed in the shape of two opposing rocket nozzles, e.g., FIG. 4B.

Figure 5:
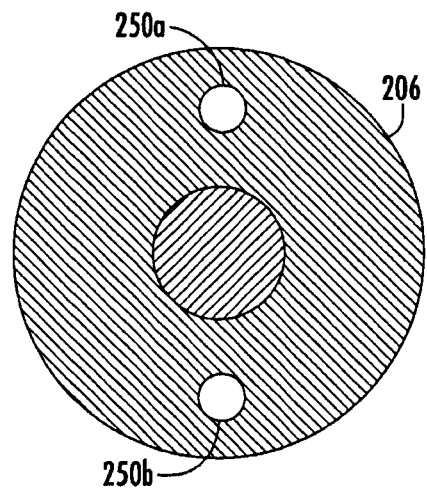
FIG. 5 is a cross-sectional, elevational end view showing the intermediate land of the spool including two fluid passageways, constructed in accordance with the present disclosure.

Referring to FIG. 5, shown therein is a cross-sectional, elevational end-view of the intermediate land 206, wherein the intermediate land 206 includes two fluid passageways 250 (identified by reference numerals 250a and 250b). It is to be understood that although the intermediate land 206 is shown with two passageways 250, any number of fluid passageways 250 can be included in the intermediate land 206, as needed for a particular application, dependent upon such considerations as, for example, the amount of pressure feedback required. In a preferred embodiment, when more than one fluid passageway 250 is used, each fluid passageway 250 is positioned in a symmetrical relationship with each other. For example, the fluid passageways 250a and 250b can be offset and/or positioned in a symmetrical manner so that an even force is applied to the intermediate land 206 by the fluid passageways 250a and 250b. For example, in FIGS. 3A, 3B, and 5, which shows the intermediate land 206 including two fluid passageways 250 (i.e., 250a and 250b), each fluid passageway 250 is positioned on opposite sides of the intermediate land 206 in a symmetrical manner, e.g., the first fluid passageway 250a is positioned in the top of the intermediate land 206 while the second fluid passageway 250b is positioned on the bottom of the intermediate land 206. Note though that references to relative positions such as "top" and "bottom" refer to the positions shown in the accompanying figures and are not intended to be limiting to the inventive aspects of the present disclosure or of devices constructed accordingly.

Additionally, although the fluid passageway 250 is shown in FIGS. 3A and 3B as extending perpendicular relative to the first and second sides 230 and 232 of the intermediate land 206, it should be understood that fluid passageway 250 can extend through the intermediate land 206 at other angles, i.e., non-perpendicular between the first and second sides 230 and 232 as determined based on a particular application.

Figure 6:
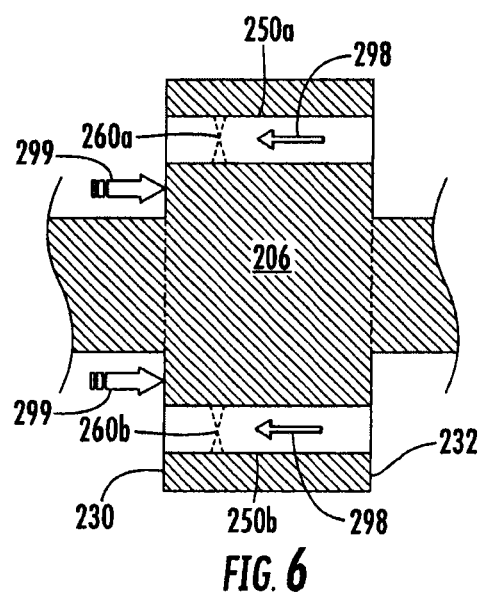
FIG. 6 is a cross-sectional, fragmental view of an alternate embodiment of the spool showing the intermediate land having two fluid passageways wherein a jet is positioned within the fluid passageways, constructed in accordance with the present disclosure.
Figure 7A:
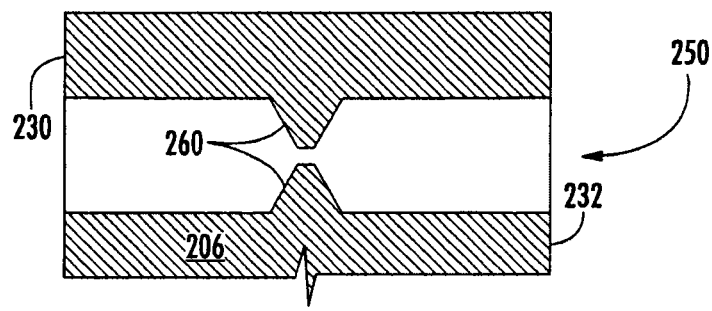
FIGS. 7A-7C are fragmental, cross-sectional views of the intermediate land of the spool shown in FIG. 6 showing different profiles for the jet positioned within the fluid passageway and constructed in accordance with the present disclosure.
Figure 7B:
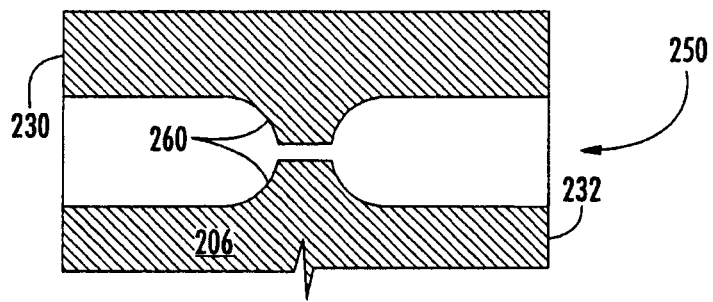
Figure 7C:
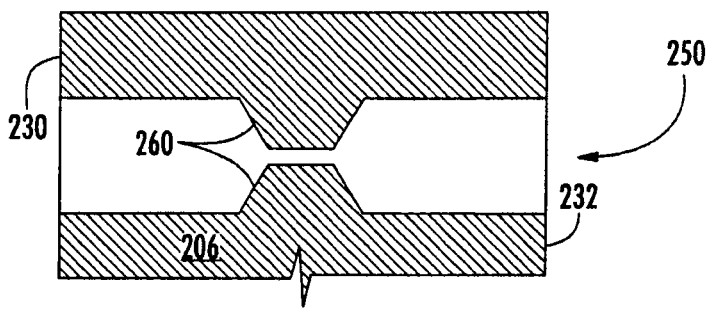

Referring now to FIG. 6, shown therein is a cross-sectional, side plan view of an alternate embodiment of the intermediate land 206 constructed in accordance with the present disclosure. In the embodiment shown in FIG. 6, the fluid passageway 250 (250a and 250b) includes a jet 260 (identified by reference numerals 260a and 260b) provided within the fluid passageway 250. The jet 260 includes an opening therein adapted to provide a fluid flow impedance to thereby provide a fluid restriction between the first and second annular spaces 240 and 242. The size of the opening of the jet 260 can be varied based on the amount of fluid restriction or pressure feedback needed for a given application. Further, the jet 260 can include a variety of profiles to thereby provide the fluid restriction. Examples of such profiles of the jet 260 within the fluid passageway 250 include, but are not limited to, the profiles shown in FIGS. 7A to 7C.

More particularly now, in one embodiment, the diameter 252 of the fluid passageway 250 can be sized such that the fluid passageway 250 provides the fluid restriction or pressure feedback between the first and second annular spaces 240 and 242. In another embodiment, the diameter 252 of the fluid passageway 250 can be larger than a diameter 252 required to provide the pressure feedback. In this embodiment, the jet 260 can be provided in the fluid passageway wherein the jet 260 provides the fluid restriction or pressure feedback between the first and second annular spaces 240 and 242. The fluid passageway 250 or the jet 260, if provided therein, operates to provide an impendence to the fluid flowing through the fluid passageway 250 between the first and second annular spaces 240 and 242.

In addition to providing a pressure feedback, the fluid passageway 250 and the jet 260, if provided therein, also performs a damping function that moderates responsiveness and ensures stability. The fluid passageway 250 and the jet 260, if provided therein, also offers the advantage of damping pressure spikes such as those which may occur when piston rod 68 (of FIG. 1) impacts a massive object. Damping these pressure spikes may reduce damage to the actuator and to the structure upon which the actuator is mounted, and may also reduce fluid cavitations in the actuator, a phenomenon well known to those skilled in the art as a common destructive phenomenon.

The fluid passageway 250 can be constructed in any manner as is well known in the art. For example, fluid passageway 250 can be formed in the intermediate land 206 using common techniques, e.g., LASER cutting, plasma cutting, hydrodrilling, a drill bit, electro discharge machine drilling (EDM), and the like. Also, the jet 260 can be formed as either an integral portion of the fluid passageway 250 during the manufacturing process or as a separate apparatus which is then inserted into and attached or otherwise affixed therein. For example, the fluid passageway 250 including the jet 260 can be formed by drilling from the first side 230 and then the second side 232 of the intermediate land 206 at least a portion of the distance towards the center of the intermediate land 206, but not so far as for the two drilled sections to meet. Then, using a smaller diameter bit, drilling through the portion separating the first two drilled sections to thereby form the jet 260. Although the above example has been provided to more clearly define one manner of forming the fluid passageway 250 including the jet 260, this example is not intended to be limiting.

In another example, the fluid passageway 250 can be formed by using the EDM technique to thereby create or otherwise form (e.g., drill) the fluid passageway 250 within the intermediate land 206. In this example, the jet 260 can be a separate apparatus which is then inserted into the fluid passageway 250. That is, the jet 260 can be formed separate from the spool 200 and then inserted into or otherwise affixed within the fluid passageway 250 of the intermediate land 206 after, or during construction of the spool 200. For example, the intermediate land 206 can be formed with the fluid passageway 250 which can be adapted to accept the jet 260. In this instance, the profile of the jet 260, and the opening provided thereby, can be selected based upon the desired amount of feedback. That is, the amount of fluid restriction being provided by the jet 260 can vary, dependent on a variety of factors wherein different profiles and/or opening sizes provide different levels of fluid feedback.

In operation, the fluid passageway 250 and, if provided therein, the jet 260 provide feedback and damping to the spool 200 via at least one mechanism. In particular, the intermediate land 206 including the fluid passageway 250 and, if provided therein, the jet 260 provides feedback from a propulsive force resulting from the exiting of the fluid from the jet 260 and/or the fluid passageway 250. More particularly, referring to FIG. 6, when the spool 200 is positioned such that second side 232 of the intermediate land 206 is exposed to the high pressure port 34 of FIG. 1 (also referred to as an inlet port), high pressure fluid will be forced through fluid passageway 250 and through the jet 260, if provided therein, and will exit the fluid passageway 250 on the first side 230, see fluid path 298. The high pressure fluid exiting the fluid passageway 250 on the first side 230 will provide feedback in the form of a propulsive force 299 which acts against the first side 230 of the intermediate land 206. Due to the pressure difference between the high and low pressure fluid and the size/shape of the fluid passageway 250 and/or the jet 260, fluid exiting the fluid passageway 250 is a sufficient flow rate (speed) to provide the propulsive force 299 acting against first side 230 of the intermediate land 206 to thereby provide feedback. As would be readily understood, the same principles would be applied in reverse when the spool 200 is positioned such that first side 230 is exposed to the high pressure port 34.

The fluid passageway 250 and the jet 260, if provided therein, have been described and shown as being positioned within the intermediate land 206 of the spool 200. However, it is to be understood that the fluid passageway 250 including the jet 260, if provided therein, can also be formed within other components of the servovalve assembly without departing from the scope of the present disclosure. For example, a fluid passageway 250 can also be formed within the piston 66 of FIG. 1.

In accordance with another aspect of the present concepts, disclosed is a method of using a hydraulic servo control system. The method comprises the steps of activating the hydraulic servo control system to thereby cause the piston rod 68 (of FIG. 1) attached to the actuator piston 66 of the servo actuator 58 to bi-directionally slide in a linear or rotating fashion. The hydraulic servo control system comprises the servovalve body 10 including the longitudinal bore 14 formed within the servovalve body 10 and the spool 200 positioned within the longitudinal bore 14. The spool 200 includes the first end land 202, the second end land 204, and the intermediate land 206 positioned between the first and second end lands 202 and 204 in a spaced apart, axially aligned relationship to thereby define the first and second annular spaces 240 and 242. The intermediate spool 206 includes at least one fluid passageway 250 formed in and extending through the intermediate land 206 to thereby establish fluid communication between the first and second annular spaces 240 and 242. The at least one fluid passageway 250 can also include a jet 260 positioned therein.

Preferred Embodiment of the Manifold

Figure 8:
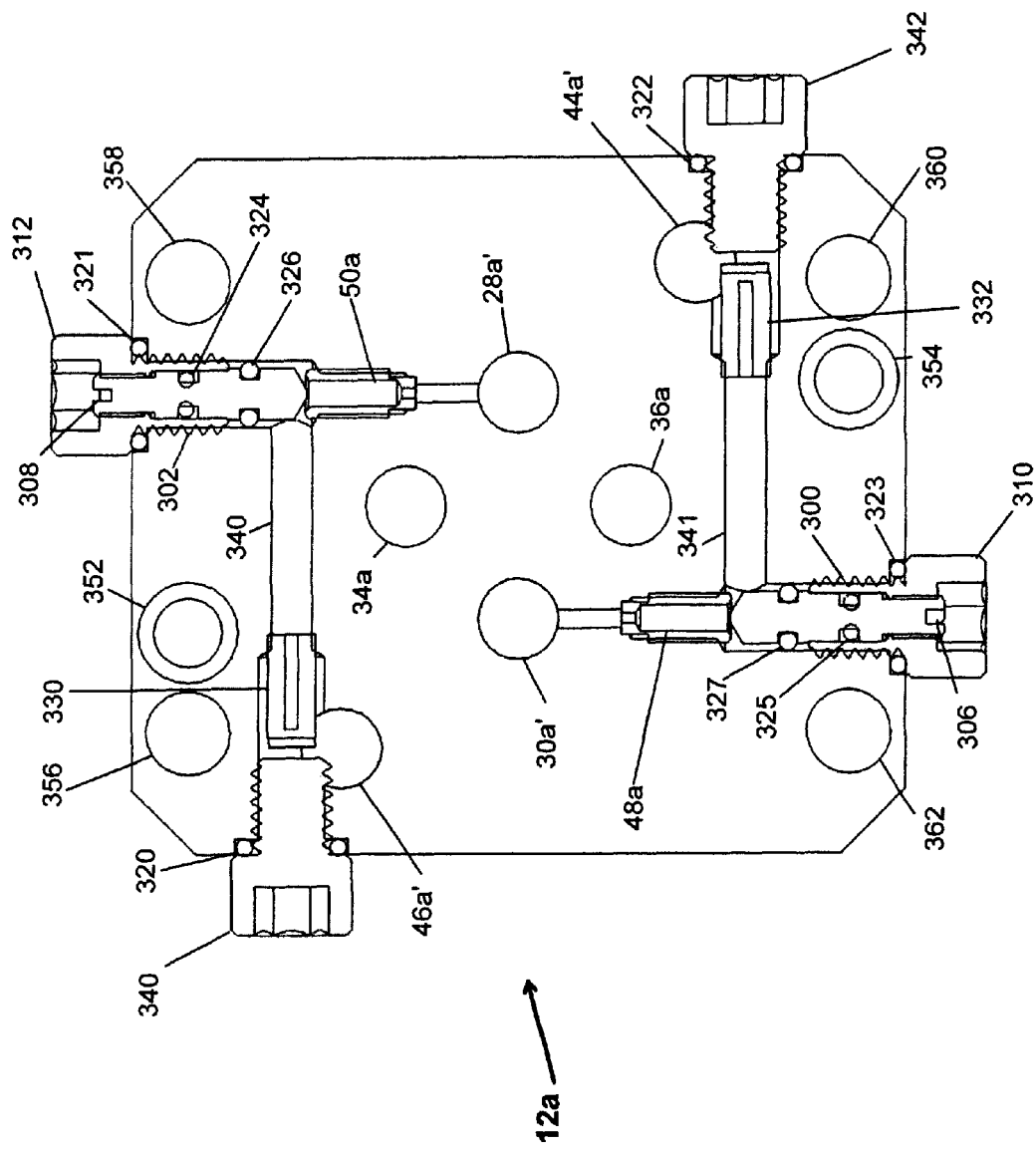
FIG. 8 is a schematic view of a manifold assembly constructed in accordance with the present disclosure.

Referring now to FIG. 8, shown therein is a schematic view of a preferred embodiment of an optional manifold 12a constructed in accordance with the present disclosure. In the preferred embodiment, the first orifice 48 (of FIG. 1) and the second orifice 50 (of FIG. 1) are constructed using a two-stage variable orifice structure comprised of fixed orifices 48a and 50a and pin or needle valve assemblies 300 and 302. More particularly, the first orifice 48 is constructed using a fixed orifice 48a in series with a variable pin or needle valve assembly 300. Similarly, the second orifice 50 is constructed using a fixed orifice 50a in series with a variable pin or needle valve assembly 302. As can be seen, the variable pin or needle valve assemblies 300 and 302 include needle valve needles 306 and 308, respectively, which allow a user of the system to manually adjust the restriction to thereby adjust the amount of feedback being provided. For example, the needle valve needles 306 and 308 can be a threaded apparatus including a head with a slot for a screwdriver (or any equivalent thereof) which permits a user of the servovalve 10 access to the needle valve needles 306 and 308 to thereby adjust the amount of feedback provided thereby. Further, needle valve needles 306 and 308 are fitted within needle valve bodies 310 and 312, respectively. Needle valve bodies 310 and 312 further include a plurality of o-ring seals 321, 323, 324, 325, 326 and 327.

In operation, fluid enters manifold 12a at ports 44a' and 46a' and passes through feedback passageways 341 and 340 to fixed orifices 48a and 50a respectively. In one embodiment, feedback passageways 341 and 340 can include microscreens 332 and 330 respectively, e.g., frits, within the feedback passageways 341 and 340. Next, fluid is then metered or otherwise passed through a predetermined restriction from variable pin or needle valve assemblies 300 and 302 to fixed orifices 48a and 50a respectively. As would be understood, needle valve needles 306 and 308, change the restriction to fluid passing between feedback passageways 341/340 and fixed orifices 48a/50a. From the adjustable pin or needle valve assemblies 300 and 302, the fluid enters the control ports 30a' and 28a' respectively to provide feedback therein. Feedback passageways 341 and 340 further include plugs 342 and 340 having o-rings 322 and 320. FIG. 8 also shows high pressure port 34a and return port 36a (see FIG. 1 for corresponding ports 34 and 36).

Note that the combination of the fixed orifices 48a and 50a in series with adjustable pin or needle valve assemblies 300 and 302 provides substantially improved adjustment capability and safety to a user of the system. That is, once a manufacturer sets the fixed orifices 48a and 50a to a value which will prevent unreasonable feedback variations, the user can then adjust the variable orifice assemblies 300 and 302 to optimize the system safely and within system tolerance levels. More particularly, the fixed orifices 48a and 50a operate to set an upper and/or lower limit on the amount of pressure feedback, preventing the user from making unreasonable adjustments via the needle valve needles 300 and 302. Therefore, the user can have less trouble adjusting the net flow restriction (ultimately PFB gain) and make also fewer errors.

As shown in FIG. 8, optional manifold 12a also shows numerous other features. For example, manifold 12a also includes a plurality of mounting bolt holes identified by reference numerals 352, 354, 356, 358, 360, and 362. Although six mounting bolt holes are shown, it would be understood in the art that any number of mounting bolt holes could be utilized for a particular application without departing from the scope of the present invention.

While the invention has been described with a certain degree of particularity, it is understood that the invention is not limited to the embodiment(s) set forth herein for purposes of exemplification, but is to be limited only by the scope of the attached claim or claims, including the full range of equivalency to which each element thereof is entitled.

What is claimed is:

1. A spool for a servovalve comprising:
a first end land having a first side, a second side opposite the first side, and a peripheral sealing surface extending from the first side to the second side;
a second end land having a first side, a second side opposite the first side, and a peripheral sealing surface extending from the first side to the second side; and
an intermediate land having a first side, a second side opposite the first side, and a peripheral sealing surface, the intermediate land being positioned between the first end land and the second end land in a spaced-apart, axially aligned relationship such that a first annular space is defined between the first end land and the first side of the intermediate land and a second annular space is defined between the second end land and the second side of the intermediate land, the intermediate land further having at least one fluid passageway formed in and extending through the intermediate land from the first side to the second side to establish fluid communication between the first annular space and the second annular space to provide a fluid pressure feedback between the first and second annular spaces and a jet provided within the at least one fluid passageway to provide fluid restriction between the first and second annular spaces.

2. The spool of claim 1, wherein the intermediate land includes two or more fluid passageways formed in and extending through the intermediate land between the first side and the second side in a symmetrical relationship to one another, each of the two or more fluid passageways having the jet provided within the fluid passageway to provide fluid restriction between the first and second annular spaces.

3. The spool of claim 1, wherein the at least one fluid passageway has a substantially uniform diameter outside of the jet.

4. A spool for a servovalve, comprising:
a first end land having a first side, a second side opposite the first side, and a peripheral sealing surface extending from the first side to the second side;
a second end land having a first side, a second side opposite the first side, and a peripheral sealing surface extending from the first side to the second side; and
an intermediate land having a first side, a second side opposite the first side, and a peripheral sealing surface, the intermediate land being positioned between the first end land and the second end land in a spaced-apart, axially aligned relationship such that a first annular space is defined between the first end land and the first side of the intermediate land and a second annular space is defined between the second end land and the second side of the intermediate land, the intermediate land further having at least one fluid passageway formed in and extending through the intermediate land from the first side to the second side to establish fluid communication between the first annular space and the second annular space to provide a fluid pressure feedback between the first and second annular spaces, the at least one fluid passageway having a substantially non-uniform diameter.

5. A hydraulic servo control system, comprising:
a servo actuator having a housing with an actuator chamber, a first actuator port a second actuator port, and an actuator piston positioned within the actuator chamber, and a piston rod attached to the actuator piston, the actuator piston being adapted to bi-directionally slide in a linear direction within the actuator chamber, the actuator piston being positioned within the actuator chamber separating the actuator chamber to thereby define a first actuator chamber and a second actuator chamber, the first actuator port in fluid communication with the first actuator chamber and the second actuator port in fluid communication with the second actuator chamber; and
a servovalve connected to the servo actuator, the servovalve comprising;
  a servovalve body having a first control port adapted to receive a first control signal, a second control port adapted to receive a second control signal, an inlet port adapted to receive a high pressure fluid, a first outlet port in fluid communication with the first actuator port, a second outlet port in fluid communication with the second actuator port, and a longitudinal bore formed within the servovalve body, the longitudinal bore including a first bore end and a second bore end, wherein the first control signal is adapted to apply a force at the first bore end and the second control signal is adapted to apply a force at the second bore end; and
  a spool positioned in the longitudinal bore and being adapted for linear bi-directional motion within the longitudinal bore between the first bore end and the second bore end in response to alternating opposing forces being applied at the first and second bore ends, the spool comprising
    a first end land;
    a second end land; and
    an intermediate land having a first side, a second side opposite the first side, the intermediate land being positioned between the first end land and the second end land in a spaced-apart, axially aligned relationship such that a first annular space is defined between the first end land and the first side of the intermediate land and a second annular space is defined between the second end land and the second side of the intermediate land, the intermediate land further having at least one fluid passageway formed in and extending through the intermediate land from the first side to the second side to establish fluid communication between the first annular space and the second annular space to provide a fluid pressure feedback between the first and second annular spaces and a jet provided within the at least one fluid passageway to provide a fluid restriction between the first and second annular spaces,
  wherein the inlet port is in alternating fluid communication with the first and the second annular spaces dependent on the position of the spool with respect to its linear bi-directional motion, and the first and second outlet ports are further in fluid communication with the first and second annular spaces to alternatingly provide the high pressure fluid to the first and second actuator chambers via the first and second actuator ports of the servo actuator.

6. The hydraulic servo control system of claim 5, wherein the servovalve body further includes a first sensor port in fluid communication with the first annular space and a second sensor port in fluid communication with the second annular space, the system further comprising:
  a manifold assembly comprising a manifold body with;
    a first signal input port in fluid communication with the first control port such that the first control signal passes through the first signal input port;
    a second signal input port in fluid communication with the second control port such that the second control signal passes through the second signal input port;
    a first manifold sensor port in fluid communication with the first sensor port;
    a second manifold sensor port in fluid communication with the second sensor port;
    a first manifold fluid passageway formed in the manifold assembly and establishing fluid communication between the first manifold sensor port and the second signal input port, the first manifold fluid passageway including a variable orifice positioned within the first manifold fluid passageway and restricting the flow of fluid between the first manifold sensor port and the second signal input port, wherein the variable orifice is adapted to be adjustable by a user of the hydraulic servo control system; and
    a second manifold fluid passageway formed in the manifold assembly and establishing fluid communication between the second manifold sensor port and the first signal input port, the second manifold fluid passageway including a variable orifice positioned within the second manifold fluid passageway and restricting the fluid between the second manifold sensor port and the first signal input port, wherein the variable orifice is adapted to be adjustable by a user of the hydraulic servo control system.

7. The hydraulic servo control system of claim 5, wherein the intermediate land of the spool includes two or more fluid passageways formed in and extending through the intermediate land between the first side and the second side in a symmetrical relationship to one another, each of the two or more fluid passageways having the jet provided within the fluid passageway to provide fluid restriction between the first and second annular spaces.

8. The hydraulic servo control system of claim 5, wherein the at least one fluid passageway has a substantially uniform diameter outside of the jet.

9. A hydraulic servo control system comprising:
a servo actuator having a housing with an actuator chamber, a first actuator port a second actuator port, and an actuator piston positioned within the actuator chamber, and a piston rod attached to the actuator piston, the actuator piston being adapted to bi-directionally slide in a linear direction within the actuator chamber, the actuator piston being positioned within the actuator chamber separating the actuator chamber to thereby define a first actuator chamber and a second actuator chamber, the first actuator port in fluid communication with the first actuator chamber and the second actuator port in fluid communication with the second actuator chamber; and
a servovalve connected to the servo actuator, the servovalve comprising;

a servovalve body having a first control port adapted to receive a first control signal, a second control port adapted to receive a second control signal, an inlet port adapted to receive a high pressure fluid, a first outlet port in fluid communication with the first actuator port, a second outlet port in fluid communication with the second actuator port, and a longitudinal bore formed within the servovalve body, the longitudinal bore including a first bore end and a second bore end, wherein the first control signal is adapted to apply a force at the first bore end and the second control signal is adapted to apply a force at the second bore end; and a spool positioned in the longitudinal bore and being adapted for linear bi-directional motion within the longitudinal bore between the first bore end and the second bore end in response to alternating opposing forces being applied at the first and second bore ends, the spool comprising
a first end land;
a second end land; and
an intermediate land having a first side, a second side opposite the first side, the intermediate land being positioned between the first end land and the second end land in a spaced-apart, axially aligned relationship such that a first annular space is defined between the first end land and the first side of the intermediate land and a second annular space is defined between the second end land and the second side of the intermediate land, the intermediate land further having at least one fluid passageway formed in and extending through the intermediate land from the first side to the second side to establish fluid communication between the first annular space and the second annular space to provide a fluid pressure feedback between the first and second annular spaces, the at least one fluid passageway having a substantially non-uniform diameter, wherein the inlet port is in alternating fluid communication with the first and the second annular spaces dependent on the position of the spool with respect to its linear bi-directional motion, and the first and second outlet ports are further in fluid communication with the first and second annular spaces to alternatingly provide the high pressure fluid to the first and second actuator chambers via the first and second actuator ports of the servo actuator.

10. A servovalve assembly comprising:
a servovalve body having an inlet port adapted to receive a high pressure fluid, a first outlet port, a second outlet port, and a longitudinal bore formed within the servovalve body, the longitudinal bore including a first bore end and a second bore end; and
a spool positioned in the longitudinal bore and being adapted for linear bi-directional motion within the longitudinal bore between the first bore end and the second bore end in response to alternating opposing forces being applied at the first and second bore ends, the spool comprising
a first end land;
a second end land; and
an intermediate land having a first side, a second side opposite the first side, the intermediate land being positioned between the first end land and the second end land in a spaced-apart, axially aligned relationship such that a first annular space is defined between the first end land and the first side of the intermediate land and a second annular space is defined between the second end land and the second side of the intermediate land, the intermediate land further having at least one fluid passageway formed in and extending through the intermediate land from the first side to the second side to establish fluid communication between the first annular space and the second annular space to provide a fluid pressure feedback between the first and second annular spaces and a jet provided within the at least one fluid passageway to provide a fluid restriction between the first and second annular spaces, wherein the inlet port is in alternating fluid communication with the first and the second annular spaces dependent on the position of the spool with respect to its linear bi-directional motion, the first and second outlet ports in fluid communication with the first and second annular spaces to alternatingly output the high pressure fluid.

11. The servovalve assembly of claim 10, wherein the intermediate land includes two or more fluid passageways formed in and extending through the intermediate land between the first side and the second side in a symmetrical relationship to one another, each of the two or more fluid passageways having a jet provided within the fluid passageway to provide fluid restriction between the first and second annular spaces.

12. The servovalve assembly of claim 10, wherein the at least one fluid passageway has a substantially uniform diameter outside of the jet.

13. A servovalve assembly, comprising:
a servovalve body having an inlet port adapted to receive a high pressure fluid, a first outlet port, a second outlet port, and a longitudinal bore formed within the servovalve body, the longitudinal bore including a first bore end and a second bore end; and
a spool positioned in the longitudinal bore and being adapted for linear bi-directional motion within the longitudinal bore between the first bore end and the second bore end in response to alternating opposing forces being applied at the first and second bore ends, the spool comprising
a first end land;
a second end land; and
an intermediate land having a first side, a second side opposite the first side, the intermediate land being positioned between the first end land and the second end land in a spaced-apart, axially aligned relationship such that a first annular space is defined between the first end land and the first side of the intermediate land and a second annular space is defined between the second end land and the second side of the intermediate land, the intermediate land further having at least one fluid passageway formed in and extending through the intermediate land from the first side to the second side to establish fluid communication between the first annular space and the second annular space to provide a fluid pressure feedback between the first and second annular spaces, the at least one fluid passageway having a substantially non-uniform diameter, wherein the inlet port is in alternating fluid communication with the first and the second annular spaces dependent on the position of the spool with respect to its linear bi-directional motion, the first and second outlet ports in fluid communication with the first and second annular spaces to alternatingly output the high pressure fluid.

* * * * *